United States Patent [19]

Stamberger

[11] Patent Number: 4,585,831
[45] Date of Patent: Apr. 29, 1986

[54] EPOXY-MODIFIED POLYOLS AND POLYMER-POLYOLS USEFUL IN THE PREPARATION OF IMPROVED PLASTICS INCLUDING POLYURETHANE FOAMS, ELASTOMERS AND THE LIKE

[75] Inventor: Paul Stamberger, Baltimore, Md.

[73] Assignee: Union Carbide Corporation, Danbury, Conn.

[21] Appl. No.: 661,611

[22] Filed: Oct. 17, 1984

Related U.S. Application Data

[60] Division of Ser. No. 501,608, Jun. 6, 1983, Pat. No. 4,495,341, which is a continuation-in-part of Ser. No. 279,318, Jul. 1, 1981.

[51] Int. Cl.$^4$ .............................................. C08G 59/00
[52] U.S. Cl. ............................................. 525/31; 525/33; 525/34; 525/107; 525/187; 525/404; 525/539
[58] Field of Search ............... 525/31, 33, 34, 107, 525/187, 404, 539

[56] References Cited

U.S. PATENT DOCUMENTS

| Re. 28,715 | 2/1976 | Stamberger | 521/137 |
|---|---|---|---|
| Re. 29,014 | 10/1976 | Pizzini et al. | 260/33.2 R |
| Re. 29,118 | 1/1977 | Stamberger | 260/2.5 BE |
| 2,996,551 | 8/1961 | De Groote et al. | 252/170 |
| 3,494,880 | 2/1970 | Austin | 521/174 |
| 3,511,882 | 5/1970 | Seale et al. | 568/640 |
| 3,652,639 | 3/1972 | Pizzini et al. | 260/465.4 |
| 3,823,201 | 7/1974 | Pizzini et al. | 260/861 |
| 3,931,450 | 1/1976 | Patton, Jr. et al. | 428/315 |
| 3,950,317 | 4/1976 | Patton, Jr. et al. | 260/88.3 A |
| 3,953,393 | 4/1976 | Ramlow et al. | 260/31.8 R |
| 4,014,846 | 3/1977 | Ramlow et al. | 260/33.2 R |
| 4,093,573 | 6/1978 | Ramlow et al. | 260/2.5 BE |

*Primary Examiner*—Maurice J. Welsh
*Attorney, Agent, or Firm*—F. W. Luzzi

[57] ABSTRACT

Adducts, improved polymer-polyols and improved polyurethane foams are provided. The adducts are produced by reacting suitable polyol and epoxy co-reactant to essentially eliminate all epoxy groups. The polymer-polyol is produced by polymerizing suitable ethylenically unsaturated monomer in the adduct or in the adduct forming mixture, in the later case the adduct forming reaction and the polymerization reaction occur simultaneously to produce the polymer-polyol. Polyurethane foams are produced by the usual method but employing the novel adduct or polymer-polyol of the present invention.

3 Claims, No Drawings

EPOXY-MODIFIED POLYOLS AND POLYMER-POLYOLS USEFUL IN THE PREPARATION OF IMPROVED PLASTICS INCLUDING POLYURETHANE FOAMS, ELASTOMERS AND THE LIKE

RELATED APPLICATIONS

This application is a division of application Ser. No. 501,608, filed 6-6-83, now U.S. Pat. No. 4,495,341, which is a continuation-in-part of application Ser. No. 279,318, filed 7-1-81.

FIELD OF INVENTION

The present invention relates to improvement of the physical properties of polyurethanes. Improved polyols and improved polymer-polyols having characteristics tailored to the production of improved polyurethanes are provided.

More specifically, the present invention relates to novel epoxy-modified polyols, which are useful reactants for producing a wide variety of synthetic plastic and elastic products. The EMPP of the invention may be used, for example, to produce cellular products, films, coatings, and cast or molded articles, such as, but not limited to polyurethanes. Where cellular or microporous articles are produced, significant improvements may be obtained in the stability of the foam-forming dispersion as well as in the load bearing characteristics, tensile strength, and stability of cell structure of the foams. More importantly, the epoxy-modified polyols can be used to produce epoxy-modified polymer-polyols (EMPP).

In one particularly useful aspect of the invention, the EMPP are employed in the production of polyurethanes, especially cellular polyurethanes. Cellular polyurethane foams constitute a broad class of polymeric materials having physical characteristics ranging from rigid to elastic-rubbery surface. The polymers are produced through the interaction of a polyfunctional isocyanate with a polyfunctional chemical compound having an active hydrogen in its structure such as a polyester, polyesteramide, polyether or a mixture of two or more such materials. The active-hydrogen-containing material is generally a liquid, or a solid capable of being melted at a relatively low temperature. The materials conventionally used contain hydroxyl groups as the radicals having the active hydrogen and are generally termed "polyols".

Despite the variety of physical and chemical properties obtainable by proper selection of the polyisocyanate and the polyol as well as by controlling the conditions under which the reaction is carried out, there are definite limitations in selectng components for optimization of desirable properties in the resulting product. One of the most significant of such limitations arises from the fact that the polyol must be sufficiently liquid at the appropriate reaction temperature to permit mixing and reaction with the polyfunctional isocyanate in producing a polyurethane resin. This requirement generally results in the use of polyols of relatively low molecular weight. However, the utility of polyols of low molecular weight is generally limited to producing rigid products. The use of higher molecular weight components is attended by a variety of other difficulties incuding handling and compounding problems. For example, polyol viscosity may be excessively high.

One known technique for producing polyurethanes with better properties incorporating higher-molecular weight components while minimizing the disadvantages mentioned above, involves employing polymer-polyols in place of or in conjunction with simple polyols for reaction with polyisocyanates to produce polyurethanes.

However, the stability of polymer-polyols generally decreases with decreasing molecular weight of the polyols used to make them, and it is difficult to avoid using relatively low molecular-weight polyols for the reasons discussed above. Instablility of polymer-polyols may lead to breakdown of the polymer-polyol dispersion during preparation and storage, resulting in coagulation. As is known in the art, it is not possible to made acceptable products with coagulated polymer-polyols, because mixing and homogeneous reaction of the reactants cannot practicably be achieved.

Also, among the polymer-polyols of greatest commercial significance have been those formed as reaction products of styrene, acrylonitrile and a polyol. There are several potential disadvantages to such systems. It is known that polymers containing acrylonitrile as a major component tend to become discolored during cure, probably because of the exothermic nature of the reaction during polyurethane formation. It is also known that styrene, when substituted for a major portion of the acrylonitrile, will prevent discoloration. However, it is normally difficult to employ high styrene-acrylonitrile ratios because the stability of reaction mixtures containing polymer-polyols generally decreases with increasing styrene content. The instability similarly can lead to difficulties in making the polymer-polyol dispersion or in breakdown after the polymer-polyol dispersion is made, resulting in coagulation. As a consequence of the above difficulties, commercial operations have often been constrained to using relatively high acrylonitrile-styrene ratios and making products in which foam discoloration was not an important consideration.

It would be desirable to provide improved techniques for producing polyurethane foams incorporatng higher molecular weight components, while avoiding problems such as foam discoloration and coagulation of the polymer-polyol dispersions. Incorporation of higher molecular weight components in the reaction mixtures would lead to higher indentation load bearing capacity (hereinafter "ILD"), tensile strength (hereinafter "TES"), and flexibility of the final products, the benefits of such improved properties being well known in the art. Improvements in these important foam properties in turn would permit reduction of the foam density needed to achieve a given level of foam strength (e.g., ILD and TES), permitting reduction in the amount of polymer needed to produce a slab of foam having a given size, as well as reducing the unit volume weight of the product. In view of the widespread use of polyurethane foam materials in automobiles, and the current pressure to reduce the weight of automobile components wherever possible, production of polyurethane foams having a given ILD and TES at reduced weight is an important continuing goal in the polyurethane industry. The products discussed above should be useful in other fields as well, such as in the production of slab stock for use by the furniture industry in seat cushions, mattresses and a variety of other products.

The epoxy-modified polymer-polyols of the present invention may be advantageously employed to improve other types of products besides polyurethane foams, including but not limited to solid polyurethane products, and polyester products. Articles with improved physical properties (e.g., ILD and TES) may be produced by the practice of the invention with those epoxy-modified polymer-polyols which appear to act as protective colloids, preventing agglomeration of polymer particles and thus adverting coagulation. Improvements in the ultimate products can be expected, since improvements in the stability of polymer-polyols will produce more uniform products, with better physical properties.

DESCRIPTION OF THE PRIOR ART

The basic polymer-polyol technology is disclosed in Stamberger U.S. Pat. No. Re. 28,715 and U.S. Pat. No. Re. 29,118. Stamberger U.S. Pat. No. Re. 29,118 discloses polymer-polyols comprising (1) a relatively high-molecular weight film-forming polymer having radicals which are reactive with the —N=C=O radicals of the isocyanate used to form the polyurethane, and (2) a reactive solvent (such as polyol) which is a solvent or dispersing medium for the polymer, and which also contains radicals which are reactive with the isocyanoto group. Polyols according to the invention must have an average molecular weight of at least 500 grams per mole, preferably at least 1,000 grams per mole, in order to produce polymer-polyols of acceptable quality.

Ramlow U.S. Pat. No. 3,953,393 discloses the production of polymer-polyols which may be used to produce polyurethanes, such as polyurethane foams, by the in situ polymerization of a vinyl monomer in an unsaturated polyol in the presence of a free radical catalyst. The unsaturated polyol may be prepared by reaction of any conventional polyol wth an organic compound having both ethylenic unsaturation and a hydroxyl, carboxyl or epoxy group. The organic compounds which can be used include unsaturated polycarboxylic acids and anhydrides and unsaturated epoxides. In all instances, the key is to introduce substantial unsaturation into the polyols or polymer-polyols and only epoxides having unsaturation are used for that purpose. This is to be compared to the present invention in which unsaturation in the polymer-polyol is insignificant and accidental, and essentially, unsaturation is avoided. Other patents of similar relevance include U.S. Pat. No. 3,652,639 (Pizzini), U.S. Pat. No. 3,950,317 (Patton, Jr.), U.S. Pat No. 3,823,201 (Pizzini), U.S. Pat. No. Re. 29,014 (Pizzini), U.S. Pat. No, 3,931,450 (Patton, Jr.) U.S. Pat. No. 4,014,846 (Ramlow), and U.S. Pat. No. 4,093,573 (Ramlow).

Patents which disclose producing adducts of a polyol and a polycarboxylic acid, which then are reacted with an epoxide to yield an adduct in which substantially all free carboxyl groups are neutralized, include Japanese Kokai No. 48/101494/73, Japanese Kokai No. 48/101498/73, British Pat. No. 1,126,025, and British Pat. No. 1,217,005.

U.S. Pat. No. 2,996,551 (De Groote), discloses adducts produced by first reacting a polyol with a monoepoxide such as propylene oxide to produce an intermediate, and then reacting the intermediate with a polyepoxide. While the patent notes that the products can be used as active-OH reactants, neither polyurethanes or polyurethane foams are mentioned.

The invention described in the patent application Ser. No. 279,318, provides improved polymer-polyols comprising, inter alia, a mixture of: (A) a minor percentage by weight of an adduct formed by reaction of a first polyol with an epoxy co-reactant selected from the group consisting of diepoxides, polyepoxides having more than two epoxy groups and mixtures, in which at least one of the epoxy groups in the epoxy co-reactant remains unreacted after reaction with the polyol; or with a half-ester co-reactant formed by 1:1 molar reaction between (a) at least one polycarboxylic compound selected from the group consisting of dicarboxylic acids, dicarboxylic acid anhydrides, polycarboxylic acids having at least three carboxylic carbon atoms and polycarboxylic anhydrides having at least three carboxylic carbon atoms, and (b) at least one epoxy compound selected from the group consisting of diepoxides and polyepoxides having at least three epoxy groups, in which at least one of the epoxy groups of the epoxy compound remains unreacted after the 1:1 molar reaction; (B) a second polyol; and (C) at least one ethylenically unsaturated monomer which is reactive with free hydroxyl groups of the first and second polyols, in which (C) has been polymerized in (A) and (B) by free radical addition polymerization to a substantially linear polymer having a molecular weight of at least about 5,000 to provide a liquid stable dispersion of polymer-polyol. In an additional embodiment, that prior invention provides improved polyurethane products including polyurethane foams, produced using the improved polymer-polyols.

GENERAL DESCRIPTION OF THE INVENTION

It has been found, according to the present invention, that improved high molecular weight elastic, plastic, cellular and microcellular products including polyurethane products, and in particular polyurethane foams, may be produced by employing and incorporating as an agent for co-reaction with a polyisocyanate, the specially-produced epoxy-modified polyol of the invention. Unlike the invention of my parent application, all but traces of the epoxy groups of the modifiers are reacted in the modified polyol. These modified polyols can be used to replace prior art polyols or, preferably, may be converted to modified polymer-polyols which are useful in place of prior polyols and polymer-polyols. The modified polyols and polymer-polyols of the invention, which will be discussed in detail below, may be combined in undiluted form directly with a polyisocyanate (and optionally aother polyol) to produce a polyurethane. In other embodiments, the modified polyols and polymer-polyols of the invention may be used in producing polymer products other than polyurethanes.

The present invention and its objects will become more apparent upon reference to the following detailed description and the appended claims.

DETAILED DESCRIPTION OF THE INVENTION

According to the present invention, epoxy-modified polyols and epoxy-modified polymer-polyols (the latter being referred to hereinafter as "EMPP") are produced which are effective in producing polyurethane products and particularly polyurethane foams. In one embodiment of the invention, the epoxy-modified polyol can be produced in the first step of a two-step process comprising (A) reacting at least one polyol with about 2% to about 10% by weight of at least one epoxide, including monoepoxides and polyepoxides, until no more than about a trace of the epoxy groups remain unreacted, and (B) polymerizing vinylly unsaturated monomers in situ in the epoxy-modified polyol of step (A) to produce the EMPP. These EMPP's can then be utilized to produce polyurethanes in which the EMPP function as the polyol in the polyol-isocyanate reaction.

A wide range of polyols and the like can be used. Among the polyols which can be employed are one or more polyols from the following classes of compositions. (Minor amounts of polyhydroxyalkanes can be present).

(a) Hydroxyl-terminated polyesters;
(b) Alkylene oxides of polyhydroxyalkanes;
(c) Trialkanolamines and alkylene oxide adducts thereof;
(d) Alcohols derived from mono- and polyamines by addition of alkylene oxides;
(e) Non-reducing sugars and sugar derivatives and alkylene oxide adducts thereof;
(f) Alkylene oxide adducts of aromatic amine/phenol/aldehyde condensation products;
(g) Alkylene oxide adducts of phosphorus and polyphosphorus acids;
(h) Polyphenols and alkylene oxide adducts thereof;
(i) Polytetramethylene glycols, and the like.

Particularly preferred polyols include poly(oxypropylene)glycols, triols and higher functionality polyols, poly(oxybutylehe)glycols, triols and higher functionality polyols, and poly(oxypropylene-oxyethylene)polyols, similarly including glycols, triols and higher-functionality polyols. In the latter class of polyols, the oxyethylene content of the polyol is preferably less than 80%, most preferably less than 60% of the total. When used, ethylene oxide can be included in any fashion along the polyol molecule chains i.e., as internal blocks, terminal blocks, and/or in random patterns.

Limited unsaturation in the polyol used does not adversely affect the operation of the invention, unless the polyol has so much unsaturation that it is in the form of a highly crosslinked polymer or gel.

The polyols employed can have hydroxyl numbers which vary over a wide range. In general, the hydroxyl numbers of the polyols employed can range from about 20, and lower, to about 400, and higher, preferably from about 30 to about 300, and most preferably, from about 35 to about 200. The hydroxyl number is defined as the number of milligrams of potassium hydroxide required for the complete hydrolysis of the fully acetylated derivative prepared from 1 gram of polyol. The hydroxyl number can also be computed by the equation:

$$OH = \frac{56.4 \times 1000 \times F}{M.W.}$$

where
OH = hydroxyl number of the polyol
F = functionality (average number of hydroxyl groups per molecule of polyol)
M.W. = molecular weight of the polyol.

The exact polyol employed depends upon the end use of the polyurethane product to be produced. For example, in the case of formed reaction products, the hydroxyl number is selected properly to result in flexible, semiflexible, or rigid foams. The above polyols preferably possess a hydroxyl number of from about 200 to about 400 when employed in rigid foam formulations, from about 70 to about 150 for semiflexible foams, and from about 20 to about 70 when employed in flexible foam formulations. Such limitations are not intended to be restrictive, but are merely illustrative of preferred polyols for particular applications.

The average molecular weight of the polyols used can range from about 500 grams per mole up to 9,000 grams per mole or more; preferably the average molecular weight ranges from about 1,000-4,000 grams per mole. Polyol average molecular weight has great influence on the character of the end products. The flexibility of polyurethane foams increases as the polyol molecular weight increases. As the polyol molecular weight decreases, more polyisocyanate is needed to produce an acceptable foam.

Epoxy compounds which may be used include, as representative examples, 3,4-epoxycyclohexylmethyl-3,4-epoxy-cyclohexane carboxylate, 1,4-butanediol diglycidyl ether, bis(3,4-epoxycyclohexyl)adipate, and 2-(3,4-epoxycyclohexyl-5,5-spiro -3,4-epoxy)cyclohexane-meta-dioxane.

Suitable epoxy compounds are commercially available, for example, from the Union Carbide Corporation (New York) under the trade name BAKELITE, from the Ciba-Geigi Corporation (New York) under the trade name ARALDITE, Dow Chemical Company (Michigan), and Celenase Corporation (New York). Additional sources of suitable epoxy compounds include the Viking Chemical Company (Minneapolis).

The reaction between the polyol and the epoxide is complete when all but traces of the epoxy groups of the epoxide have reacted with the polyol, as determined by the pyridinium chloride test to be further explained below. These reactions are preferably carried out as a temperature of about 50°-90° C., most preferably about 60°-70° C. for about 3 hours.

The epoxy-modified polyol can also be produced as the adduct of a polyol and a half-ester intermediate formed as the reaction product of (1) at least one polycarboxylic compound selected from the group consisting of dicarboxylic acids, dicarboxylic acid anhydrides, polycarboxylic acids having at least three carboxylic carbon atoms and polycarboxylic anhydrides having at least three carboxylic carbon atoms, and (2) at least one epoxy compound. The epoxy compounds mentioned above are suitable for use. To produce the adducts, the polycarboxylic and epoxy compounds are allowed to react at a temperature of about 100°-140° C., preferaboy about 130° C. for about a half-hour. The intermediate is then allowed to react with the polyol as described in the previous embodiment to produce the epoxy-modified polyol.

The times and temperatures specified above for the various reactions are exemplary but not required. Catalysts may be added to accelerate the reactions, as taught below in the Examples, permitting use of lower temperatures and shorter reaction times. Suitable catalysts are well known in the art.

Polymer-polyols are well known in the art. The basic technology is disclosed in Stamberger U.S. Pat. No. Re. 28,715 and U.S. Pat. No. Re. 29,118. Generally, in order to produce a conventional polymer-polyol, an ethylenically unsaturated monomer is polymerized in situ in an appropriate polyol. The polymerization produces a stable, dispersed polymer in the polyol. The polymer dispersion, known as a polymer-polyol, can be employed as a reactant in a number of reactions (e.g., polyurethane-forming reactions) to introduce into the resultant product, as an integral part thereof, both the polyol and the dispersed polymer.

The epoxy-modified polyols may be used in the same manner as polyols were previously used in forming polymer-polyols. Preferably, the unsaturated monomer is metered into the polyol reaction medium at a rate corresponding approximately to the polymerization reaction rate so that there is not a large amount of unreacted monomer in the reaction mixture at any particular time. An alternative method to all of the foregoing is to:

(a) dissolve the epoxy compound in the unsaturated monomer,
(b) react this mixture with a suitable polyol, and
(c) polymerize the monomer in this mixture without separate formation and isolation of the epoxy-modified polyol.

The resulting EMPP has excellent properties which makes this simplified process quite desirable.

The conventional method for making polymer-polyols comprises the following steps which are known in the art:

(a) Dispersing a minor amount of an ethylenically unsaturated monomer in a major amount of at least one normally liquid polyol having a molecular weight of at least about 500 and a hydroxyl number in the range of about 20 to about 600 by feeding the monomer into the polyol at a regular and continuous rate, and (b) Polymerizing said monomer in said polyol by free radical addition polymerization in the presence of a conventional free-radical catalyst to a substantially linear polymer having a molecular weight of at least about 5,000 to provide a liquid, stable dispersion of polymer-polyol having a viscosity of less than about 40,000 cps. (centipoises) at 10% polymer concentration. During this polymerization, a minor amount of graft or block polymer is inherently produced. Thus, regardless of whether or not the ethylenically unsaturated monomer itself contains radicals reactive with the isocyanato group, the reactive compositions produced always contain film-forming polymer having radicals reactive with the isocyanato group. Among ethylenically unsaturated monomers which do not have a radical reactive with the isocyanato group are styrene, methyl methacrylate and vinyl acetate; however, all of these produce, after polymerization, reactive compositions that contain a film-forming polymer having a minor amount of reactive radicals introduced from the polymerization medium and the reactive compositions react with the isocyanato group.

Polymer-polyols may be produced by polymerizing the ethylenically unsaturated monomers in the selected polyol at a temperature of from about 40° C. to 150° C. in the presence of a catalytically effective amount of a conventional free radical catalyst known to be suitable for the polymerization of ethylenically unsaturated monomers. Preferably, the monomers are fed into the polyol over about three hours while maintaining the polyol at about 130°–140° C., and the reactants are then maintained at about 140°–150° C. for an additional hour. These are preferred but optional reaction conditions.

A polyol chosen for use in producing a polymer-polyol must meet several requirements in addition to the requirements discussed above in relation to polyols in general:

(1) It must act as a solvent or dispersing medium for the film-forming polymer produced by polymerization of the ethylenically-unsaturated monomers.

(2) It must not be so reactive with the film-forming polymer as to reduce substantially the reactive radical content of either the solvent or the polymer or to form a gel or a hard infusible resin which would interfere with or even prevent the reaction with the polyisocyanate.

(3) It should form stable solutions or dispersions with the film-forming polymer which are preferably dilutable without the formation of undesirable precipitates with the components used to form the polyurethane polymer.

(4) It must be a liquid, at least at the temperature used for the reaction with the polyisocyanate.

(5) It must have at least two radicals which are reactive with the —N=C=O of the polyisocyanates so as to form a reaction product with the polyisocyanate.

Among the polyols that can be employed for producing polymer-polyols are hydroxyl-terminated polyesters, polyhydroxyalkanes, polyphenols, polyoxyalkylene polyols, or the like and the corresponding mercapto derivatives.

The monomers which may be used are the polymerizable monomers characterized in that they have at least one polymerizable ethylenically unsaturated group of the type, (C=C). The monomers can be used singly or in combination to produce homopolymer/polyol or copolymer/polyol reactive compositions.

These monomers are well known in the art and include the hydrocarbon monomers such as butadiene, isoprene, 1,4-pentadiene, 1,6-hexadiene, 1,7-octadiene, styrene, alpha-methylstyrene, methylstyrene, 2,4-dimethylstyrene, ethylstyrene, isopropylstyrene, butylstyrene, phenylstyrene, cyclohexylstyrene, benzylstyrene, and the like, substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl-4-vinylbenzoate, phenoxystyrene, p-vinyl diphenyl sulfide, p-vinylphenyl phenyl oxide, and the like; the acrylic and substituted acrylic monomers such as acrylic acid, methacrylic acid, methylacrylate, hydroxypropyl acrylate, 2-hydroxyethyl acrylate, 2-hydroxyethyl methacrylate, methyl methacrylate, cyclohexyl methacrylate, benzyl methacrylate, isopropyl methacrylate, hydroxypropyl methacrylate, octyl methacrylate, methacrylonitrile, methyl alpha-chloroacrylate, ethyl alpha-ethoxyacrylate, methyl alpha-acetaminoacrylate, butyl acrylate, 2-ethylhexyl acrylate, phenyl acrylate, phenyl methacrylate, acrylonitrile, alpha-chloroacrylonitrile, substituted acrylamides including N,N-dimethylacrylamide, N,N-dibenzylacrylamide, and N-butylacrylamide acrylamide, methacrylyl formamide, and the like; the vinyl esters, vinyl ethers, vinyl ketones, etc. such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, t-butylaminoethyl methacrylate, dimethylaminoethyl methacrylate, glycidyl acrylate, allyl alcohol, glycol monoesters of itaconic acid, diglycol esters of itaconic acid, methyl monoester of itaconic acid, dichlorobutadiene, vinyl pyridine, and the like. Any of the known polymerizable monomers can be used and the compounds listed above are illustrative and not restrictive of the monomers suitable for use in this invention. Any of the known chain transfer agents can be present if desired.

Illustrative of catalysts which can be used in producing polymer-polyols are the well-known free radical types of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, t-butyl peroxybenzoate, alpha,alpha'-azo-2-methyl butyronitrile, alpha, alpha'-2-methyl heptonitrile, 1,1'-azo-1-cyclohexane carbonitrile, dimethyl alpha,alpha'-azo-isobutyrate, 4,4'-azo-4-cyanopentanoic acid, azo-bisisobutyronitrile, persuccinic acid, diisopropyl peroxy dicarbonate, and the like; a mixture of catalysts may also be used.

The concentration of the catalyst can vary from about 0.001 to about 5 percent, preferably from about 0.2 to about 0.5 percent; however, any effective catalytic amount is satisfactory.

The polymerization can also be carried out with an inert organic solvent present. Illustrative thereof are toluene, benzene, acetonitrile, ethyl acetate, hexane, heptane, dicyclohexane, dioxane, acetone, N,N-dimethylformamide, and N,N-dimethylacetamide.

Acceptable polymer-polyols normally have a maximum polymer particle size ranging from about 1 to about 6 microns; preferably, from about 1 to about 3 microns; and most preferably, about 1 micron or less. Polymer-polyols having particles of maximum diameter of less than 1 micron are considered for the purposes of this invention to be on the borderline of invisibility when examined under a microscope. Polymer-polyols having particles of 1-3 microns maximum diameter are considered to be of medium size. Polymer-polyols having particles of 4-6 microns maximum diameter are considered to be of large size.

Polymer-polyols should contain from about 5 to 50% by weight of dispersed polymer. A preferable concentration is about 20 to 50% by weight. Polymer-polyols having in excess of about 50% by weight of dispersed polymer are ordinarily too viscous for practical purposes.

The EMPP can be used to produce polyurethane products, particularly polyurethane foams. Where EMPP is used as the polymer-polyol, upon addition of a polyisocyanate to the polymer-polyol, reaction occurs with the isocyanato groups and the EMPP is chemically and integrally bound in the resulting polyurethane.

The epoxy-modified polymer-polyols may be used in prepolymer processes, quasi-prepolymer processes and one-shot processes as known to those skilled in the art. The polyurethanes may be further reacted with epoxy resins, cured with sulfur, peroxides or other curing agents, or otherwise reacted or modified as known to those skilled in the art. In using the one-shot process for production of polyurethanes, it is desirable to also use a silicone oil emulsifier as described in U.S. Pat. Nos. 2,834,748 and 2,917,480 (Bailey).

The isocyanates used to form the polyurethanes of the present invention must be polyfunctional. Examples of such polyisocyanates are the toluene diisocyanates, hexamethylene diisocyanates, diphenylmethane diisocyanates, naphthalene diisocyanates, triphenylmethane triisocyanates, phenylene diisocyanates, dimethyldiphenylmethane diisocyanates, triisocyanatodiphenyl ethers, et cetera, such as meta-toluene diisocyanate, 4,4'-diphenyl diisocyanate, 4,4'-diphenylene methane diisocyanate, 1,5-naphthalene diisocyanate, 4,4'-diphenyl ether diisocyanate, p-phenylene diisocyanate, ethylene diisocyanate, trimethylene diisocyanate, cyclohexylene diisocyanate, 2-chloropropane diisocyanate, xylylene diisocyanates, et cetera. A mixture of 80% 2,4-tolylene diisocyanate and 20% 2,6-tolylene diisocyanate is particularly preferred; this mixture will be referred to hereinafter as toluene diisocyanate. Other polyisocyanates which can be used will occur to those skilled in the art.

The extremely versatile nature of the invention makes possible the production of products having a wide variety of characteristics, and can effectively be used for forming not only cellular and microcellular polyurethane products, but also films, coatings, cast or molded articles, et cetera.

As is well known, cellular polyurethane products may be obtained by inducing the polyurethane reaction in the presence of a gas-producing agent or "blowing agent" such as a fluorohydrocarbon. Alternatively, the polyurethane-producing reaction may be induced in the presence of water, which reacts with the isocyanate to release carbon dioxide, an effective blowing agent. An excess of the polyisocyanate should be used to compensate for the loss of polyisocyanate due to reaction with water. Since water acts indirectly to release carbon dioxide, water will be considered as a blowing agent in this invention. By this invention, in which polyurethanes and polyurethane foams are produced using the epoxy-modified polymer-polyols discussed above, significant improvements may be obtained in the load bearing characteristics (ILD) of foam products as well as the tensile strength (TES) and stability of the foam cells.

In a preferred embodiment of the invention, styrene and acrylonitrile are copolymerized in an EMPP of the invention and subsequently reacted with a polyisocyanate to produce a polyurethane. The polyurethane can be expanded conventionally to produce a foam.

As discussed earlier, there have been difficulties in the past with using the styrene-acrylonitrile systems for producing polyurethanes. In particular, high styrene-acrylonitrile ratios lead to instability of the reaction mistures used to produce polymer-polyols. Production of products using low styrene-acrylonitrile ratios or acrylonitrile alone results in excessive buildup of heat from the exothermic curing reaction and causes discoloration of the product. This invention alleviates these problems, as it is possible to produce polyurethane reaction mixtures at a given solids concentration and polyol molecular weight, having high styrene-acrylonitrile ratios, without the attendant problems of dispersion instability and product discoloration. The styrene-acrylonitrile ratios according to the invention are preferably in the range from 50:50 up to 100:0; an approximately 60:40 to 80:20 ratio is preferred and a 70:30 ratio is particularly preferred. The polymer dispersions obtained according to this aspect of the invention are characterized by a minute particle size, i.e., little or no tendency to exhibit coagulation or excessive grit content.

This invention is further illustrated by the following examples, without, however, being restricted thereto. All parts are by weight, unless otherwise specified.

Commercially available polyols useful in the Examples include:

Polyol A—Polypropylene oxide—polyethylene oxide triol made from propylene and ethylene oxide and glycerine, and having a theoretical number average molecular weight of 6200 and a hydroxyl number of about 25. The alkylene oxide units are present primarily in blocks and the end units are substantially all ethylene oxide units, i.e. the ethylene oxide is used to "cap" the triol. Based on its total weight, this triol contains about 14 weight percent ethylene oxide. (Such a polyol is commercially available from BASF Wyandotte Corporation under the trade name Pluracol 380 Polyol).

Polyol B—Polypropylene oxide-polyethylene oxide triol made from propylene and ethylene oxides and glycerine and having a theoretical number average molecular weight of about 4700 and a hydroxyl number of about 35.9. The alkylene oxide units are present primarily in blocks and the end units are substantially all ethylene oxide units, i.e., the ethylene oxide is used to "cap" the triol. Based on its total weight, this triol contains about 14 wt-% ethylene oxide. (Such a polyol is commercially available from Union Carbide under the trade name Niax 11-27).

Polyol C—Polypropylene glycol, a polyether diol having a theoretical number average molecular weight of 4000 and a hydroxyl number of 28.0. Typically, this diol has a viscosity (25° C.) of 930 cSt and an apparent specific gravity (20/20° C.) of 1.004 (such as polyol is commercially available from Union Carbide under the trade name Niox PPG-4025).

Polyol D—Polypropylene oxide-polyethylene oxide triol made from propylene and ethylene oxides and glycerine and having a theoretical number average molecular weight of about 6,000 and a hydroxyl number of about 26.1. The alkylene oxide units are present primarily in blocks and the end units are substantially all ethylene oxide units, i.e., the ethylene oxide is used to "cap" the triol. Based on its total weight, this triol contains about 14 wt-% ethylene oxide. (Such a polyol is commercially available from Union Carbide under the trade name of Niax 11-34).

Polyol E—Polypropylene oxide-polyethylene oxide polyol made from propylene oxide and ethylene oxide and an 80/20 blend by weight of sorbitol and glycerine, having a theoretical number average molecular weight of about 10,800 and a hydroxyl number of about 28. The alkylene oxide units are present primarily in blocks, and the end units are substantially all ethylene oxide units, i.e., the ethylene oxide is used to "cap" the polyol. The polyol contains about 8 wt-% ethylene oxide units based on the total polyol weight. (Such a polyol is commercially available from Union Carbide under the trade name Niax 16-56).

Polyol F—Polypropylene oxide triol made from polypylene oxide and glycerine and having a theoretical number average molecular weight of about 3,000 and a hydroxyl number of about 55.4. (Such a polyol is commercially available from Union Carbide under the trade name Niax Lg-56).

Polyol G—Polypropylene oxide—polyethylene oxide triol made from propylene and ethylene oxides and glycerine, and having a theoretical number average molecular weight of 3000 and a hydroxyl number of about 58. The alkylene oxide units are present primarily in blocks and the end units are substantially all ethylene oxide units, i.e., the ethylene oxide is used to "cap" the triol. Based on its total weight, this triol contains about weight percent ethylene oxide. (Such a polyol is commercially available from BASF Wyandotte Corporation under the trade name Pluracol Polyol 718).

Commercially available epoxides useful in the Examples include:

Epoxy A, Epoxy B, and Epoxy C—These are homologs of the diglycidyl ether of bisphenol—A. They have epoxide equivalent weight ranges of 177-188, 182-190, and 172-176, respectively. (Commercially available from The Dow Chemical Company under the trade names D.E.R. 330, D.E.R. 331, and D.E.R. 332).

Epoxy D—This epoxy resin is a polyglycol di-epoxide available from Dow Chemical Company under the trade name D.E.R. 732.

Epoxy E—3,4-Epoxycyclohexylmethyl-3,4-Epoxycyclohexane carboxylate having an epoxy equivalent weight of 131 to 143 grams/gram mol of oxirane oxygen. (Such an epoxy resin is commercially available from Union Carbide under the trade name E.R.L.-4221)

Epoxy F—A diglycidyl ether of bisphenol A having an epoxy equivalent weight of 185-200 grams per gram mole epoxide. (Such as epoxy resin is commercially available from Celanese Corporation under the trade name Epi-Rez-510)

Epoxy G—Butyl glycidyl ether, a mono-epoxide having an epoxy value of 0.67-0.77 equivalent per 100 grams and a weight of 130-149 grams per gram mole epoxide. (Available commercially from Ciba-Geigy under the trade name ARALDITE RD-1).

Epoxy H—1,4-Butanediol diglycidyl ether, a di-epoxide having an epoxy value of 0.75 equivalents per 100 grams and a weight of 134 grams per mol of epoxide. (Available commercially from Ciba-Geigy under the trade name ARALDITE RD-2).

The ILD and TES characteristics of foams in the Examples were measured using ASTM D1564-71 standard test methods. The ILD test basically involves measuring the pressure (pounds per square inch) necessary to compress a foam sample of standard size to a specified percentage of one of its original dimensions. The TES test basically involves compressing a foam sample of standard size to a solid film before the foam sets, and measuring the tensile strength of the film (pounds per square inch-gravity).

In carrying out the KOH titration test, the amount of unreacted carboxyl groups in a product is determined by direct titration with an alcoholic solution of one-tenth normal KOH using Methylene Blue as an indicator (pH). Unreacted carboxyl groups are calculated in units of milligrams of KOH per gram of the sample. A KOH equivalent ranging from 0 to about 3 indicates that most carboxyl groups of any carboxylic compounds used in the reactions have been reacted, e.g., with hydroxy moieties. A KOH equivalent of about 4 or greater (more particularly 7 or greater), indicates that a significant amount of free carboxyl groups remain unreacted, as is the case in half-esters.

The free epoxy content of a reaction mixture may be determined using the pyridinium hydrochloride method. A sample is reacted with an excess of pyridinium hydrochloride and the unreacted HCl is titrated with methanolic NaOH to a pink endpoint. The epoxide content is determined by calculation of the amount of pyridinium hydrochloride consumed during the reaction. In order to correct for inaccuracies due to the presence of any acid in the sample itself, an identical sample is then reacted with pyridine instead of pyridinium hydrochloride and the acid value is added to the calculation for epoxy content. (See Critchfield, F.E., Organic Functional Group Analysis; Vol. 8 in International Series of Monographs on Analytical Chemistry, (Macmillan Co., New York 1963), P. 134; and Mitchell, J., et al, Organic Analysis, Vol. 1, (Interscience Publishers, New York 1953), p. 144).

Unsaturation is an adduct of polymer-polyol may be determined using the dodecyl mercaptan method. (NMR could alternatively be used). Standard reagents including the following are prepared: (1) 25 grams of N-dodecyl mercaptan in one liter of ethanol; (2) 50 grams of potassium anhydride in one liter of ethanol; and (3) a 0.05 to 0.01 Normal iodine solution in aqueous potassium iodide.

An adduct or polymer-polyol sample weighing about 6.5 grams is added to a 250 ml iodine flask containing 50 ml of ethanol. After dissolution of the sample, 25 ml of alcoholic mercaptan solution is pipetted into the flask and neutralized with potassium hydroxide (the potassium anhydride solution). One additional milliliter of potassium anhydride is then added as a catalyst. After allowing the mixture to stand for about two minutes, the mixture is acidified with 1-2 ml of glacial acetic acid and diluted with an additional 25 ml of ethanol. The solution is titrated with the standardized iodine solution to a faint yellow endpoint. A blank is run using the same procedure, without adding adduct or polymer-polyol sample and with no potassium hydroxide. The millimoles of unsaturation per gram of the sample are calculated as follows:

$$\text{millimoles unsaturation} = \frac{(B - A) N}{W}$$

B = milliliters of iodine required to titrate blank
A = milliliters of iodine required to titrate the sample
N = Normality of the iodine solution
W = Weight of the sample
(See Kohthoff and Belcher, Volumetric Analysis, Vol. 2 (Interscience Publishers, N.Y. 1957) pp. 389-390).

SUMMARY OF FOAM FORMULATIONS - Examples 1-27

In each of the examples, foams were produced by reaction of the adduct or the polymer-polyol with TDI. The monomer uses for the polymerpolyol was styrene/acrylonitrile in each case.

| Example | Adduct | | Polymer-Polyol | |
|---|---|---|---|---|
| | Epoxy | Polyol | Epoxy | Polyol |
| 1,10 (Control) | — | — | — | A |
| 2 | A | A | — | — |
| 3 | — | — | A | A |
| 4 | B | A | — | — |
| 5 | — | — | B | A |
| 6 | C | A | — | — |
| 7 | — | — | C | A |
| 8 | D | A | — | — |
| 9 | — | — | D | A |
| 11,13,15 | E | A | — | — |
| 12,14,16 | — | — | E | A |
| 17 (Control) | — | — | — | B |
| 18,20,22 | E | B | — | — |
| 19,21,23 | — | — | E | B |
| 24 | F | A | — | — |
| 25 | — | — | F | A |
| 26 | A | C | — | — |
| 27 | — | — | A | C |

EXAMPLE 1 (Control)

(a) Preparation of polymer-polyol.

As taught in my prior patents, polymer-polyols can be prepared as follows: 584 grams of polyol A [Pluracol 380] are placed in a reaction vessel of suitable dimensions. The reactor is equipped with a stirrer, thermometer and opening for reactant feed. Monomer is fed from a separatory funnel together with a vinyl polymerization catalyst, by means of a proportioning pump. The typical monomer feed comprises 126.8 grams of styrene, 74.0 grams of acrylonitrile and 5.2 grams of an azo catalyst [Vazo "64"]. The polyol reactant is heated to a temperature of about 100° C., monomer mixture is then fed into the reactor at a rate of about 4 milliliters per minute. After all of the monomer mixture has been fed, the reaction mixture is maintained at about 140° C. for 2 hours. The polymer-polyol is now ready for use in the polyurethane-forming reaaction.

(b) Production of polyurethane foam

In a typical process, 100 grams of the polymer-polyol is mixed with 1.0 grams of a foam stablizer [Union Carbide Silicone No. 6202], 0.2 ml. of stannous octoate catalyst, 0.125 ml. of an isocyanate-reaction catalyst for urethane formation [Union Carbide Niax Catalyst A-6] and 54.0 grams of toluene diisocyanate (TDI) (about 20% of the 2,6 isomer and about 80% of the 2,4 isomer). To this mixture were added 4.5 grams of water to decompose the TDI to form $CO_2$ as small bubbles and initiate foam formation. The foam is poured into a suitable form; in about 5 minutes, maximum foam height is attained. The product is then heated for about 2 hours at 100° C. and allowed to cool overnight to room temperature. The foam will then be stabilized and can be tested (ILD's, etc.). The foam product of this example had a density of 2.53 lb./ft.$^3$, and ILD's of 56.2 and 131.3 lb./50 in.$^2$ after 25% and 65% compressions, respectively.

EXAMPLE 2

Polyol A, 750.0 grams was blended with epoxy A, 37.5 grams, and the mixture was heated for 3 hours at 60° C. to provide a adduct having an unreacted epoxy content of 0.3 moles epoxy per kg. total and a viscosity of 2,300 cp. A polyurethane foam was produced in the manner described in Example 1, part (b), except that the 100 grams of polymer-polyol were replaced by 100 grams of the epoxide/polyol adduct. The resulting foam had a density of 2.3 lb./ft.$^3$ and ILD's of 81.25 and 175.0 lb./50 in.$^2$ at 25% and 65% compressions, respectively.

EXAMPLE 3

Example 1, part (a), was repeated except that the 584 grams of polyol A were replaced by 584 grams of the epoxide-reacted polyol of Example 2. The resulting EMPP was used in place of the polymer-polyol in part (b) of Example 1. The final foam product had a density of 2.6 lb./ft.$^3$ and ILD's of 168.8 and 381.3 lb/50 in.$^2$ at 25% and 65% compressions respectively.

EXAMPLES 4 AND 5

The Examples correspond to Examples 2 and 3, respectively, except the epoxy A was replaced by epoxy B. The physical properties of the resulting foams are summarized in Table 1.

EXAMPLES 6 AND 7

These examples correspond to Examples 2 and 3, respectively, except that epoxy A was replaced by epoxy C. The physical properties of the resulting foams are summarized in Table 1.

EXAMPLES 8 and 9

These Examples correspond to Examples 2 and 3, respectively, except that epoxy A was replaced by epoxy D. The physical properties of the resulting foams are summarized in Table 1.

TABLE 1

| Example No. | Foam Density lb./ft. | ILD, lb./50 in.$^2$ at 25% compression | at 65% compression |
|---|---|---|---|
| 2 | 2.3 | 81 | 175 |
| 3 | 2.6 | 169 | 381 |
| 4 | 2.39 | 103 | 216 |
| 5 | 1.67 | 112 | 250 |
| 6 | 2.58 | 78 | 169 |
| 7 | 3.25 | 200 | 378 |
| 8 | 1.86 | 50 | 109 |
| 9 | 2.53 | 175 | 378 |

As is evident from the data of Table 1, the introduction of epoxide into the polyol or polyol-polymer significantly increases the ILD of the resulting foams over that obtained when the epoxide is omitted as in Example 1. As is also evident, however, the inclusion of the epoxide in the form of a polymer-polyol as in the odd-numbered Examples in Table 1 is a dramatic improvement in ILD over either the control polymer-polyol product of the epoxy-reacted polyol of the even-numbered Examples.

EXAMPLE 10

Example 1 was repeated except that the control foam had a density of 2.53 lb./ft.$^3$ and ILD's of 56.2 and 131.3 lb/50 in.$^2$ at 25% and 65% compressions, respectively.

EXAMPLES 11 AND 12

Examples 2 and 3, respectively, were repeated except the epoxy compound was epoxy E at the 2% level rather than the 5% level; the polyol employed was from the same batch used for Example 10. The foam properties are set forth in Table 2.

EXAMPLES 13 AND 14

Examples 2 and 3, respectively, were repeated except that the epoxy compound was epoxy E. The foam characteristics are set forth in Table 2.

EXAMPLES 15 AND 16

Examples 2 and 3, respectively, were repeated except that epoxy E was employed instead of epoxy A at a 10% level. The foam properties are set forth in Table 2.

TABLE 2

| Example No. | Foam Density, lb./ft.$^3$ | ILD, lb./50 in.$^2$ at 25% compression | at 65% compression |
|---|---|---|---|
| 11 | 2.77 | 78 | 162 |
| 12 | 2.87 | 81 | 222 |
| 13 | 2.48 | 59 | 156 |
| 14 | 3.87 | 200 | 381 |
| 15 | 2.15 | 50 | 109 |
| 16 | 2.87 | 97 | 378 |

EXAMPLE 17

Example 1 was repeated except that the polyol was polyol B (Niax 11-27). The resulting foam had a density of 2.29 lb./ft.$^3$ and ILD's of 58 and 109 lb./50 in.$^2$ at 25% and 65% compressions, respectively.

EXAMPLES 18 AND 19

Examples 2 and 3, respectively, were repeated except that the polyol was polyol B and the epoxy compound was epoxy E at a 2% level. The foam characteristics are to be found in Table 3.

EXAMPLES 20 and 21

Examples 2 and 3, respectively, were repeated except that the polyol was polyol B and the epoxy compound was epoxy E. The foam characteristics are to be found in Table 3.

EXAMPLES 22 AND 23

Examples 2 and 3, respectively, were repeated except that the polyol used was polyol B and the epoxy compound was epoxy E to the 10% level. The foam characteristics are to be found in Table 3.

TABLE 3

| Example No. | Foam Density lb./ft.$^3$ | ILD, lb./50 in.$^2$ at 25% compression | at 65% compression |
|---|---|---|---|
| 18 | 2.96 | 53 | — |
| 19 | 2.82 | 164 | 312 |
| 20 | 3.16 | 65 | 160 |
| 21 | 2.92 | 100 | 169 |
| 22 | 3.16 | 59 | 144 |
| 23 | 2.39 | 112 | 216 |

TENSILE ELONGATION STRENGTH

The tensile elongation strength (TES) was measured on foam segments cut from foam produced according to Examples 17 and 21. The test method corresponds to ASTM D 412 with TES measured in pounds per square inch. For the foam of Example 17, TES was 7.8 to 10.1 psi; for foam of Example 21, TES was 15.9 to 18.9 psi.

EXAMPLE 24

Polyol A, 750.0 grams, was blended with epoxy F, 48.7 grams, and the mixture was heated for 2 hours at 60° C. at which point the product exhibited an unreacted epoxy content of 0.38 moles epoxy per kg. total and a viscosity of 2,400 cps. A polyurethane foam was produced from this product in the same manner as in Example 1 except that the 100 grams of polymer-polyol was replaced by 100 grams of the epoxide-reacted polyol. The resulting foam had a density of 1.62 lb./ft.$^3$ and ILD's of 50.0 and 115.0 lb./50 in.$^2$ at 25% and 65% compressions, respectively.

EXAMPLE 25

Example 1 was repeated except that the 584 grams of polyol A were replaced by 584 grams of the epoxide-reacted polyol of Example 24. The final foam product had a density of 2.10 lb./ft.$^3$ and ILD's of 112 and 231 lb./50 in.$^2$ at 25% and 65% compressions, respectively.

EXAMPLES 26 AND 27

These Examples correspond to Examples 2 and 3, respectively, except that polyol A was replaced by polyol C and epoxy A was replaced by epoxy E. The physical properties of the resulting foams are summarized in Table 4.

TABLE 4

| Example No. | Foam Density, lb./ft. | ILD, lb./50 in.$^2$ at 25% compression | ILD, lb./50 in.$^2$ at 65% compression |
|---|---|---|---|
| 24 | 1.62 | 50 | 115 |
| 25 | 2.10 | 112 | 231 |
| 26 | Foam product too poor to test | | |
| 27 | 2.63 | 138 | 300 |

As was described previously herein, it is possible to dissolve the epoxide in the monomer phase and introduce this monomer-epoxide mixture into the polyol in the same manner that the monomer had been added to polyol or epoxy adduct. When following this procedure, an epoxy-modified polymer-polyol is obtained that is fully the equivalent of that obtained by other means described herein and in many ways may be considered superior in regard to uniformity of product and the speed and ease of reaction.

EXAMPLE 28

Polyol B, in an amount of 292 grams, was charged to a reactor and heated to a temperature above 100° C. A monomer mixture was separately prepared comprising 63.4 grams of styrene, 37.9 grams of acrylonitrile and 2.6 grams of Vazo catalyst. To this monomer mixture were added 14.6 grams of epoxy E. This epoxide-monomer mixture was then introduced into the reactor containing the heated polyol mixture at a metered rate of 2 milliliters per minute. Throughout the addition, the reaction vessel was agitated and the reaction mixture was maintained in the temperature range of 100° to 120° C. A white uniform dispersion was obtained in which the particles were on the borderline or visibility. The final product had small uniform particles and a viscosity of 3800 cps. A polyurethane foam produced from this product in the manner described previously had a density of 2.05 lb./ft.$^3$ and ILD's of 100 and 185 lb./50 in.$^2$ at 25% and 65% compressions, respectively.

This example can be carried out effectively with a polyol blend, as well. One such blend comprises 70 parts by weight of polyol E and 30 parts b, weight of polyol B.

As was noted previously the ILD's were measured by the specific ASTM method; in addition these tests were modified to provide additional information. In a typical case, the foam formulation is poured into a paper box of dimensions generally 8"×6.5"×4", where the foaming mixture is permitted to rise and set until it is solid. Thereafter it is cured for 2 hours at 120° C. Within two to three hours thereafter a test specimen measuring 2"×2"×2" is cut from the foam and placed between the parallel plates of a compression tester. The product is then compressed by about 25% based on original height and the ILD is recorded. The speciment is then compressed by 75% of its original height, released and again compressed by 75% of its original height. The Sample is then again retested, immediately, at the 25% compression level at 10 minute intervals for approximately 40 minutes and again on the following day. This modified test permits evaluation of the compression recovery characteristics of the foam. The products of the present invention showed excellent recovery characteristics, particularly when compared to the prior art polyol-based polyurethanes or polymer-polyol based polyurethanes.

SUMMARY OF EXPERIMENTAL FINDINGS

Following the practices of the present invention, greater than 2% but less than 10% of a epoxide can be introduced into polyols with essentially all of the epoxide reacted. The resulting adducts can be used in the manner of ordinary polyols to produce improved polyurethane foams directly, or to produce improved polymer-polyols which in turn can be used as polyols in polyurethane forming reactions to provide still greater enhancement of the physical properties of the resulting polyurethane foams. Not only are these adducts essentially free of epoxy activity, they are also essentially free of unsaturation; nevertheless, when incorporated in polymer-polyol reactions, the resulting polyurethane foam has physical characteristics such as ILD and TES which far exceed those of the prior art. These improvements are accomplished without sacrifice of the other properties of urethane foam. It is found that the properties are particularly enhanced when the original polyol contains substantial blocks of ethylene oxide as is typified by the ethylene oxide containing polyols described earlier herein. The improvements are obtained not only with polyepoxides but are also obtained with monoepoxides, or diepoxides which have been converted to monoepoxides by reaction of one of the epoxide radicals with a carboxyl, hydroxyl or the like. It has been shown that the process can be conducted stepwise, in which a polyol and the epoxide are reacted and an ethylenically unsaturated monomer is introduced into the adduct polyol to produce the polymer-polyol which in turn is used for the production of polyurethane foams, or alternatively, the epoxide can be dispersed in the monomer which in turn is introduced into the base polyol and reacted therein to form the epoxy modified polymer-polyol directly. As noted the adducts can be used for the production of polyurethane foams directly and it can be used for the production of the polymer-polyol. In addition, however, these epoxy modified adducts have been found to provide enhanced dispersion stabilizing when included with other polymer-polyols in quantities as low as 1% of the total polymer-polyol mixture.

I claim:

1. A stable polymer-polyol comprising the reaction product of:
   (a) a polyol having an average molecular weight of at least about 500, that is essentially free of ethylenic unsaturation,
   (b) an epoxy co-reactant that is essentially free of ethylenic unsaturation, and
   (c) at least one ethylenically unsaturated monomer which is reactive with free hydroxyl groups of said polyol and said epoxy co-reactant by free radical addition polymerization to a substantially linear polymer having a molecular weight of at least 5000 wherein said polyol acts as a dispersing medium for the linear polymer, is liquid at the reaction temperature and has at least two radicals which are reactive with the —N=C=O of a polyisocyanate.

2. A method of producing a stable polymer-polyol comprising (a) introducing (i) at least one ethylenically unsaturated monomer which is reactive with free hydroxyl groups of a polyol into a reaction vessel containing (ii) a polyol having an average molecular weight of at least about 500 that is essentially free of ethylenic unsaturation and (iii) an epoxy co-reactant that is essentially free of ethylenic unsaturation or, (iv) an adduct of said polyol and said epoxy co-reactant and (b) polymerizing said monomer by free radical addition polymerization to a substantially linear polymer having a molecular weight of at least 5000, wherein said polyol or adduct acts as a dispersing medium for the linear polymer, is liquid at the reaction temperature and has at least two radicals which are reactive with the —N=C=O of a polyisocyanate.

3. A method in accordance with claim 2 in which said monomer is metered into said reaction vessel at a rate equivalent to approximately the polymerization rate under the conditions existing in said reaction vessel.

* * * * *